March 28, 1961

C. G. BUELTMAN ET AL 2,977,202

APPARATUS FOR CONDITIONING PRECIPITATES
AND SEPARATING SAME FROM LIQUIDS

Filed July 2, 1956

CHARLES G. BUELTMAN
& JOHN S. KNEALE
INVENTORS

BY

ATTORNEY

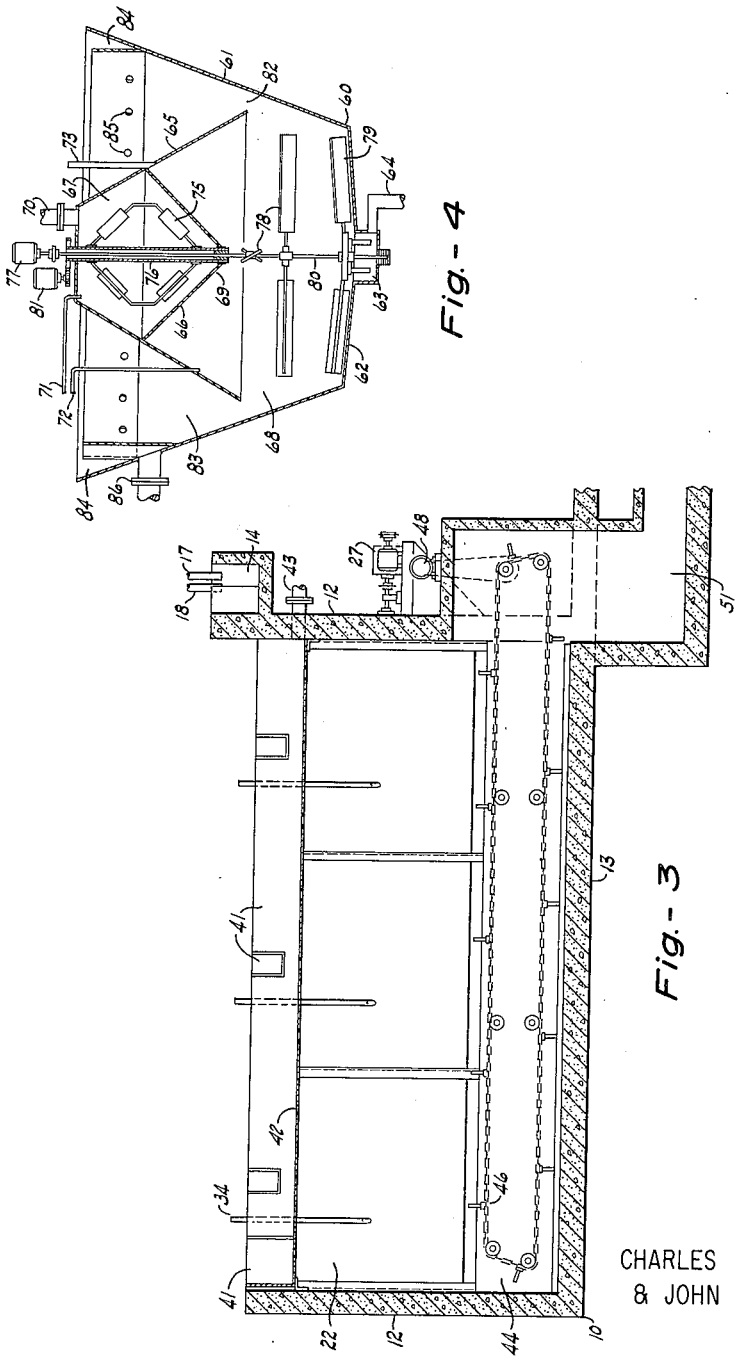

United States Patent Office 2,977,202
Patented Mar. 28, 1961

2,977,202
APPARATUS FOR CONDITIONING PRECIPITATES AND SEPARATING SAME FROM LIQUIDS

Charles G. Bueltman, Amityville, N.Y., and John S. Kneale, Ridgewood, N.J., assignors to Pfaulder Permutit Inc., a corporation of New York Filed July 2, 1956, Ser. No. 595,371

2 Claims. (Cl. 23—285)

This invention relates to apparatus for conditioning precipitates and separating same from liquids and, more particularly, for treating aqueous solutions where two separate chemical reactions are required for complete treatment of the solution.

Specific examples of such solutions requiring a two-step treatment are the following:

Cyanide solution requires the addition of chlorine for the reduction of cyanide to cyanate and a further addition of chlorine for the reduction of cyanate to gases consisting of carbon dioxide and nitrogen. The addition of chlorine tends to acidify the solution requiring the addition of an alkali—either caustic soda or lime—in order to compensate for the acidifying effect of the chlorine.

Another example of a solution requiring a two-step treatment is chromic acid containing solutions such as spent plating solutions. As a first step in treating such solution the pH of the solution is reduced to 2.5 or less by the addition of acid and at the same time a sulfite containing compound such as sulphur dioxide sodium metabisulfite is added for the reduction of hexavalent chromium to trivalent chromium. As a second step an alkali such as lime is added to the solution to increase the pH to 8.5 or higher which causes the trivalent chromium to precipitate in the form of the hydroxide.

After the precipitate has been caused to form in the second treatment step such precipitate is removed from the solution and this is advantageously accomplished in a precipitation zone by contact with previously formed precipitate or sludge.

The object of this invention is to provide a single, compact, and economical apparatus in which a complete treatment as described above may be carried out. The manner in which this object is achieved is shown in the accompanying drawings in which:

Fig. 3 is another vertical section of the same apparatus taken along lines 3—3 of Fig. 1; and Fig. 4 is a vertical section of another modification of our invention.

Figure 1:
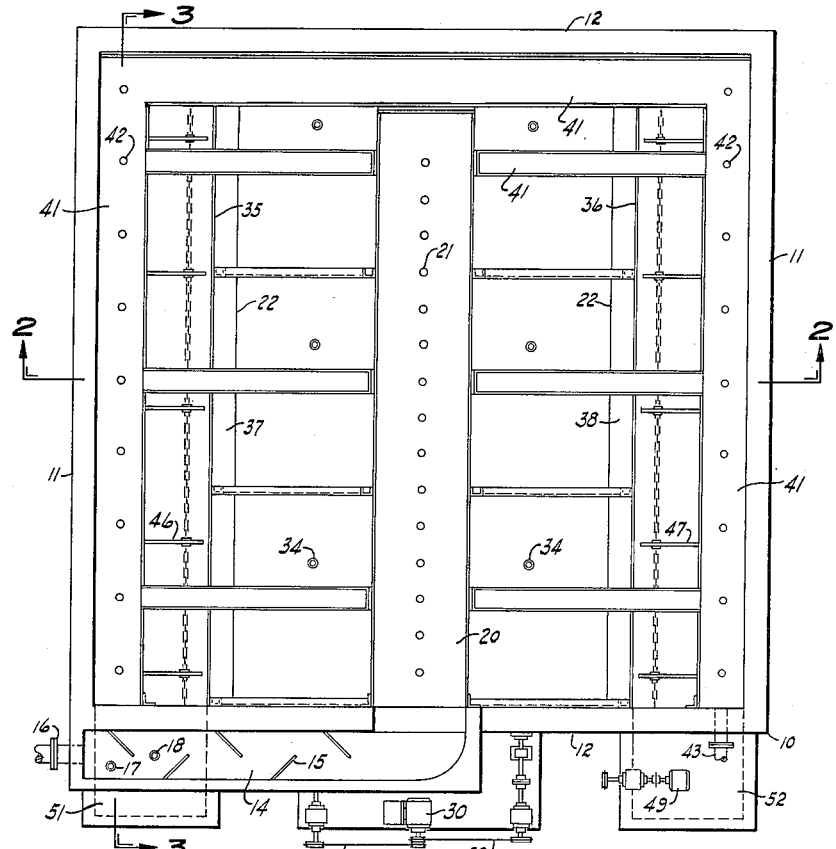
Fig. 1 is a plan view of an apparatus according to our invention.

Referring now to Fig. 1, the apparatus comprises a rectangular tank 10 having side walls 11, end walls 12, and a bottom 13. The apparatus is provided with an inlet chamber 14 fitted with baffles 15 and with an inlet 16 for the liquid to be treated. Inlets 17 and 18 for chemical solutions are arranged to discharge into the inlet chamber 14. The inlet chamber 14 communicates with an inlet flume 20 having orifices 21 in its bottom. A pair of inclined walls 22 are joined to the bottom of the inlet flume 20 and a pair of inclined partitions 23 in turn have their upper ends joined to the inclined walls 22. Thus, the inclined walls 22 and the inclined partitions 23 form a primary mixing chamber 24 and a secondary mixing chamber 25. A horizontal shaft agitator 26 is arranged to be rotated in the primary mixing chamber 24 by a drive mechanism. A pair of horizontal shaft agitators 28 and 29 are arranged to be rotated in the secondary mixing chamber 25 by means of a drive mechanism 30 and belts or chains 31 and 32. The arrangement is preferably such that the agitators 28 and 29 rotate in opposite directions. The secondary mixing chamber 25 is provided with an inlet 33 for chemical solutions and with vents 34 to release air or gases from the secondary mixing chamber 25. On the bottom 13 of the tank are vertical walls 35 and 36. The inclined walls 22 extend close to the upper ends of the vertical walls 35 and 36, leaving therebetween ports 37 and 38 for the passage of liquid. There are two precipitation chambers 39 and 40 formed within the tank, one on each side between a side wall 11 and an inclined wall 22.

At the top of the tank 10 is a system of outlet troughs 41 provided with orifices 42 and connected with an outlet 43 for treated liquid. Between the walls 35 and 36 and the side walls 11 are two sludge pockets 44 and 45, each below one of the precipitation chambers 39 and 40, respectively. The sludge pockets 44 and 45 are provided with sludge scrapers 46 and 47, respectively, operated by drive mechanisms 48 and 49, respectively. Each sludge pocket is provided with a sludge outlet 51 and 52, respectively. On the bottom 13 of the tank and within the secondary mixing chamber 25 are perforated flush-back headers 53 through which water may be admitted periodically to stir up sludge that has settled on the bottom of this compartment.

The lower ends of the inclined partitions 23 are spaced apart to form a port 55 through which communication is established between the primary mixing chamber 24 and the secondary mixing chamber 25.

Figure 2:
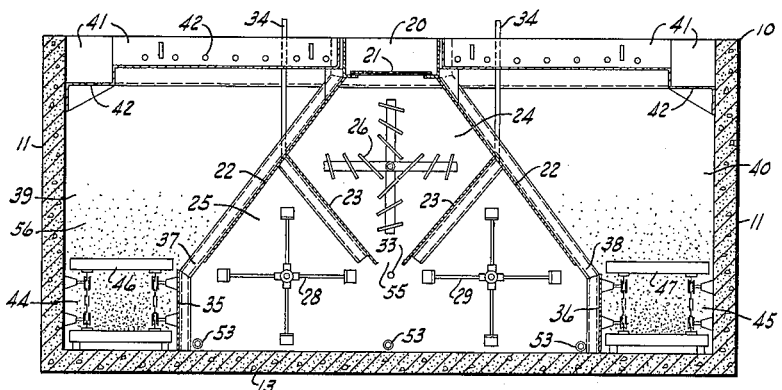
Fig. 2 is a vertical section of the same apparatus taken long lines 2—2 of Fig. 1.

Operation of the apparatus shown in Figs. 1 to 3 is as follows, using as an example the treatment of chromic acid containing solution:

The liquid to be treated is admitted through inlet 16. Acid solution and the sulfite containing solution are admitted through chemical inlets 17 and 18, respectively. In flowing past the baffles 15 in the inlet chamber 14 a preliminary mixing of liquid and chemical solutions is obtained. The mixture then flows into the inlet flume 20 and passes through the orifices 21 into the primary mixing chamber 24 where it is agitated by the action of the agitator 26. The solution then flows through the port 55 into the secondary mixing chamber with an alkali being added through the inlet 33 to the solution flowing through the port 55. In the secondary mixing chamber 25 the solution is subject to further agitation by the agitators 28 and 29 and thereupon flows through the ports 37 and 38 into the precipitation chambers 39 and 40, respectively, in which a suspended mass of sludge 56 is maintained. As the liquid undergoing treatment rises through the sludge in precipitation chambers 39 and 40 substantially all precipitates are removed from it and clear, treated solution rises to the top of the precipitation chambers to flow thence via orifices 42 and the outlet troughs 41 to the outlet 43 for treated liquid.

During operation of the apparatus sludge continually settles into the sludge pockets 44 and 45 wherein the moving sludge scrapers 46 and 47, respectively, push it to the sludge outlets 51 and 52, respectively, for disposal.

Referring now to the modification shown in Fig. 4, this apparatus is of circular rather than rectangular construction. It comprises a tank 60 having a conical shell 61 and a bottom 62 which has a slight pitch towards a central sludge pocket 63 connected to a sludge outlet 64.

Within the tank 60 is a frusto-conical wall 65 to which is joined a partition 66 in the form of an inverted cone.

A primary mixing chamber 67 is formed above the partition 66 and the conical wall 65 and a secondary mixing chamber 68 is formed below the partition 66. In the partition 66 are ports 69 through which the two mixing chambers communicate. The apparatus is provided with a water inlet 70 and a chemical inlet 71, both discharging into the primary mixing chamber 67. A chemical inlet 72 discharges into the secondary mixing chamber 68 which is provided with a vent 73 to release air or gases from the top of the secondary mixing chamber. An agitator 75 located in the primary mixing chamber 67 is mounted on a hollow shaft 76 which is rotated by a drive mechanism 81. In the secondary mixing chamber 68 are agitator blades 78 and a sludge scraper 79 mounted on shaft 80 which passes through the hollow shaft 76 and is rotated by a drive mechanism 77. Between the lower end of the conical wall 65 and the tank wall 61 is an annular port 82 through which the secondary mixing chamber 68 communicates with a precipitation chamber 83. In the upper portion of the precipitation chamber 83 is a peripheral outlet trough 84 provided with orifices 85 and communicating with an outlet 86 for treated liquid.

In operation of the apparatus shown in Fig. 4, liquid to be treated and chemical solution are admitted to the primary mixing chamber 67 through the inlets 70 and 71, respectively. They are mixed by action of the agitator 75 and then flow through the ports 69 into the secondary mixing chamber 68 where additional chemical is added through the inlet 72. The solution is again agitated by the action of the blades 78 and the solution then passes through the port 82 into the precipitation chamber 83 to rise through the sludge bed maintained therein for substantially complete removal of the precipitates. The treated solution then flows through the orifices 85 and the outlet trough 84 to the outlet 86. Sludge is scraped in the bottom of secondary mixing chamber 67 by the sludge scrapers 79 into the sludge pocket 63 whence it is discharged through sludge outlet 64.

When the solution in the primary mixing chamber is acid, as is the case in the treatment of chromic acid containing solutions, the interior of the primary mixing chamber is advantageously lined with rubber or other suitable acid-resistant material.

While we have shown what we consider the best forms of our invention, modifications may be made without departing from its spirit and reference is, therefore, made to the following claims for a definition of the scope of our invention.

What we claim is:

1. Apparatus for treating liquid comprising a rectangular tank having side walls and a bottom, an inlet flume centrally located in the upper portion of said tank, liquid distributing means in said inlet flume, a pair of inclined walls each extending from said flume downwardly and outwardly, a pair of inclined partitions each having its upper end joined to one of said inclined walls, the lower ends of said inclined partitions being spaced apart to form a passageway, a primary mixing chamber bound by said flume, the upper parts of said inclined walls and said inclined partitions, said liquid distributing means being adapted to discharge into said primary mixing chamber, a secondary mixing chamber below said primary mixing chamber bound by said inclined partitions, the lower parts of said inclined walls and said tank bottom, said primary and secondary mixing chamber communicating with each other through said passageway, sedimentation zones between said side walls and said inclined walls, ports adjacent to the lower ends of said inclined walls and establishing communication between said secondary mixing chamber and said sedimentation zones, a horizontal shaft agitator in said primary mixing chamber, a pair of horizontal shaft agitators in said secondary mixing chamber, means for admitting liquid to be treated and chemical to said inlet flume, a pipe terminating in said secondary mixing chamber for admitting a second chemical to said secondary mixing chamber, means for withdrawing treated liquid from the upper portion of each of said sedimentation zones, and means for withdrawing sludge from the lower portion of said tank.

2. Apparatus for treating liquid comprising a rectangular tank having side walls and a bottom, two vertical partitions on said bottom parallel to two of side walls and forming sludge concentration pockets, an inlet flume parallel to said partitions and centrally located in the upper portion of said tank, liquid distributing means in said inlet flume, a pair of inclined walls each extending from said inlet flume to adjacent to the upper end of one of said partitions thereby forming two ports between the upper ends of said partitions and the lower ends of said inclined walls, a pair of inclined partitions each having its upper end joined to one of said inclined walls, the lower ends of said inclined partitions being spaced apart to form a passageway, a primary mixing chamber bound by said flume, the upper parts of said inclined walls and said inclined partitions, a secondary mixing chamber below said primary mixing chamber bound by said inclined partitions, the lower parts of said inclined walls, said vertical partitions and said tank bottom, sedimentation zones between said side walls and said inclined walls, a horizontal shaft agitator in said primary mixing chamber, a pair of horizontal shaft agitators in said secondary mixing chamber, means for admitting liquid to be treated and chemical to said inlet flume, secondary means for admitting chemical to said secondary mixing chamber, means for withdrawing treated liquid from the upper portion of each of said sedimentation zones, and means for withdrawing sludge from said sludge concentration pockets.

References Cited in the file of this patent

UNITED STATES PATENTS

| | | |
|---|---|---|
| 2,433,458 | Kahn et al. | Dec. 30, 1947 |
| 2,458,261 | Green et al. | Jan. 4, 1949 |